Dec. 28, 1965 W. A. RUST 3,226,479

TANDEM TOOL ADAPTER CIRCUIT

Filed Dec. 28, 1962 3 Sheets-Sheet 1

INVENTOR.
Willard A. Rust

BY C. A. Gulbrandsen

ATTY.

Dec. 28, 1965 W. A. RUST 3,226,479

TANDEM TOOL ADAPTER CIRCUIT

Filed Dec. 28, 1962

3 Sheets-Sheet 2

INVENTOR.
Willard A. Rust

BY C. A. Gulbrandsen
ATTY.

Dec. 28, 1965 W. A. RUST 3,226,479

TANDEM TOOL ADAPTER CIRCUIT

Filed Dec. 28, 1962 3 Sheets-Sheet 3

3,226,479

TANDEM TOLL ADAPTER CIRCUIT

Willard A. Rust, Park Ridge, Ill., assignor to Automatic Electric Laboratories, Inc., Northlake, Ill., a corporation of Delaware Filed Dec. 28, 1962, Ser. No. 248,047
4 Claims. (Cl. 179—7)

The present invention relates to an automatic toll ticketing system and more particularly to such systems in which calls originating at dial stations in small exchanges, having ticketing equipment for making a record of toll calls originated therefrom, are routed via tandem exchanges to complete the desired connection. The tandem exchanges in many instances are also arranged to ticket all incoming calls that are switched therethrough. This has come about with the recent rapid increase in the number of dial telephone installations that incorporate toll ticketing equipment without translator-sender facilities for routing calls. Therefore, it has become increasingly apparent that to preserve the relative simplicity of the ticketing equipment means must be provided to permit the tandem offices to preform the routing for the connecting exchanges, without at the same time printing a duplicate record of call.

Accordingly, it is the primary object of this invention to provide an adapter circuit, for accessing the ticketing equipment of a tandem exchange with routing equipment, for obtaining routing information while controlling the routing and associated recording equipment to prevent a record being made of the call.

A feature of this invention is a circuit to accept simplex pulses from the branch exchange and convert these to loop pulses to the ticketer.

Another feature of this invention is a means to accept loop pulses from the ticketer and covert this to simplex pulses outgoing to the intertoll selector.

Still another feature of this invention is the use of a transfer relay to transfer the outpulsing path from the accessed tandem ticketing equipment to a trunk associated selector.

Further objects and features of the invention pertain to the particular arrangement of the circuit elements of the system whereby the above outlined and additional features are attained.

Figure 1:
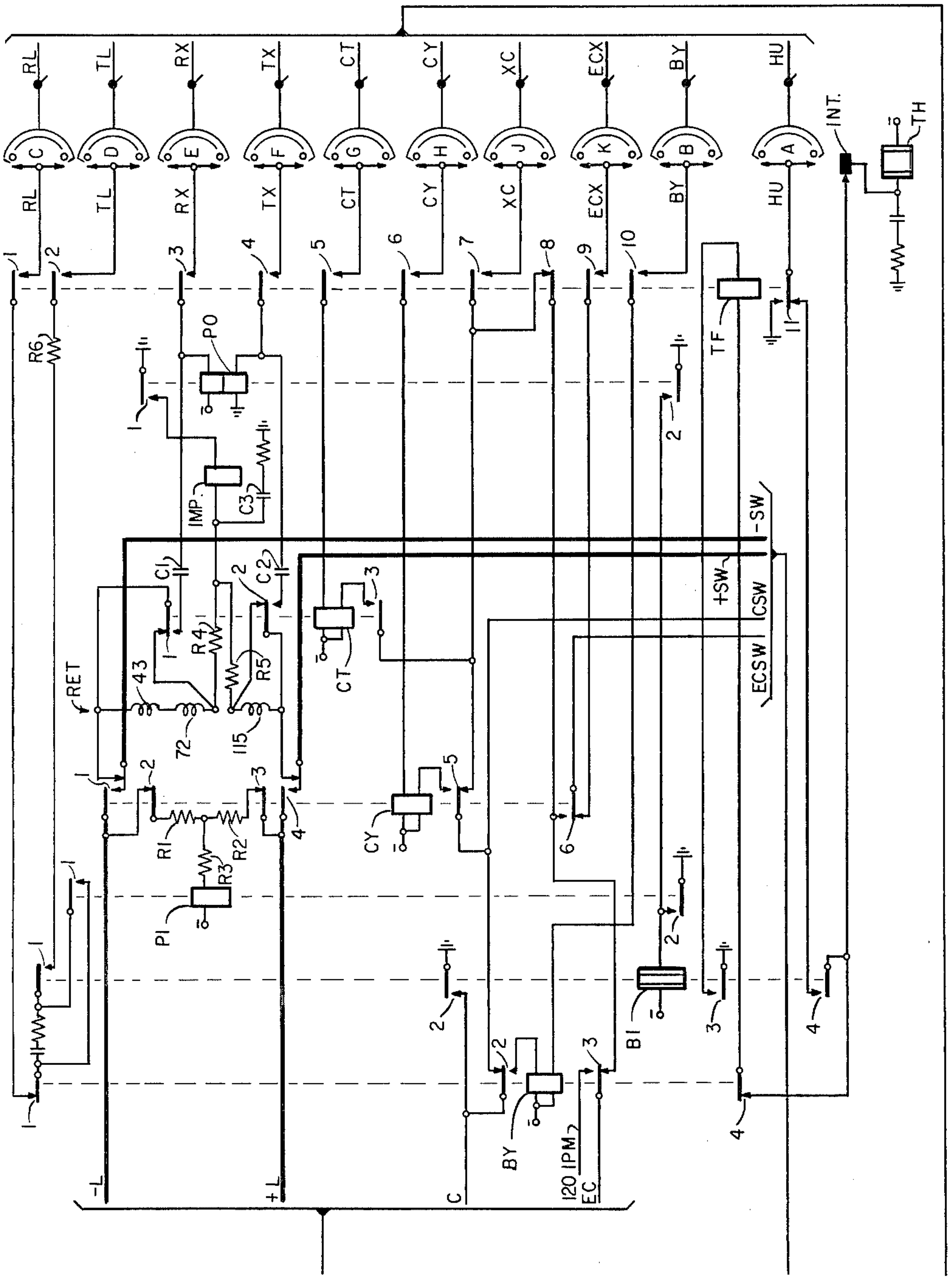
Figure 2:
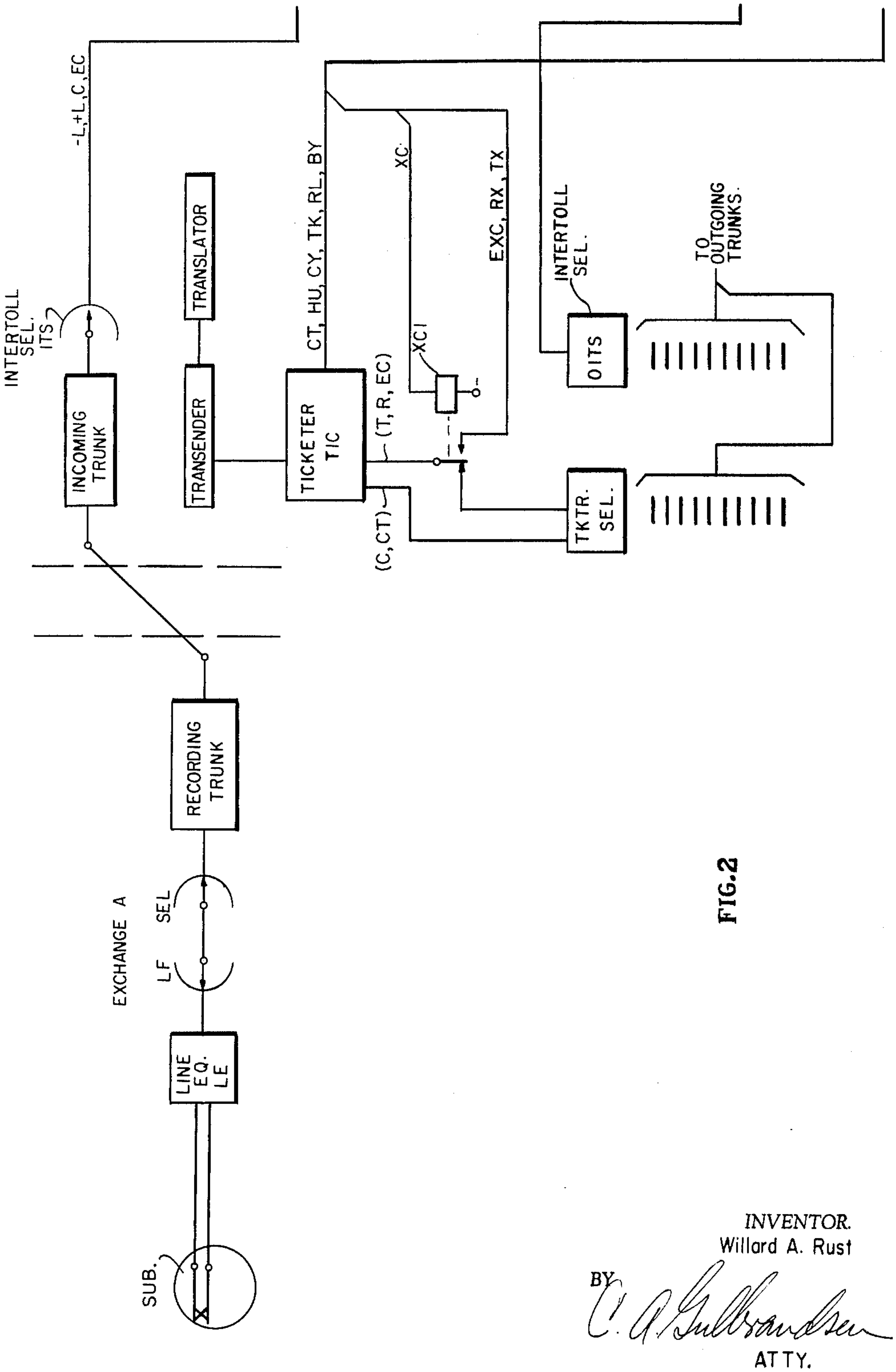
Figure 3:
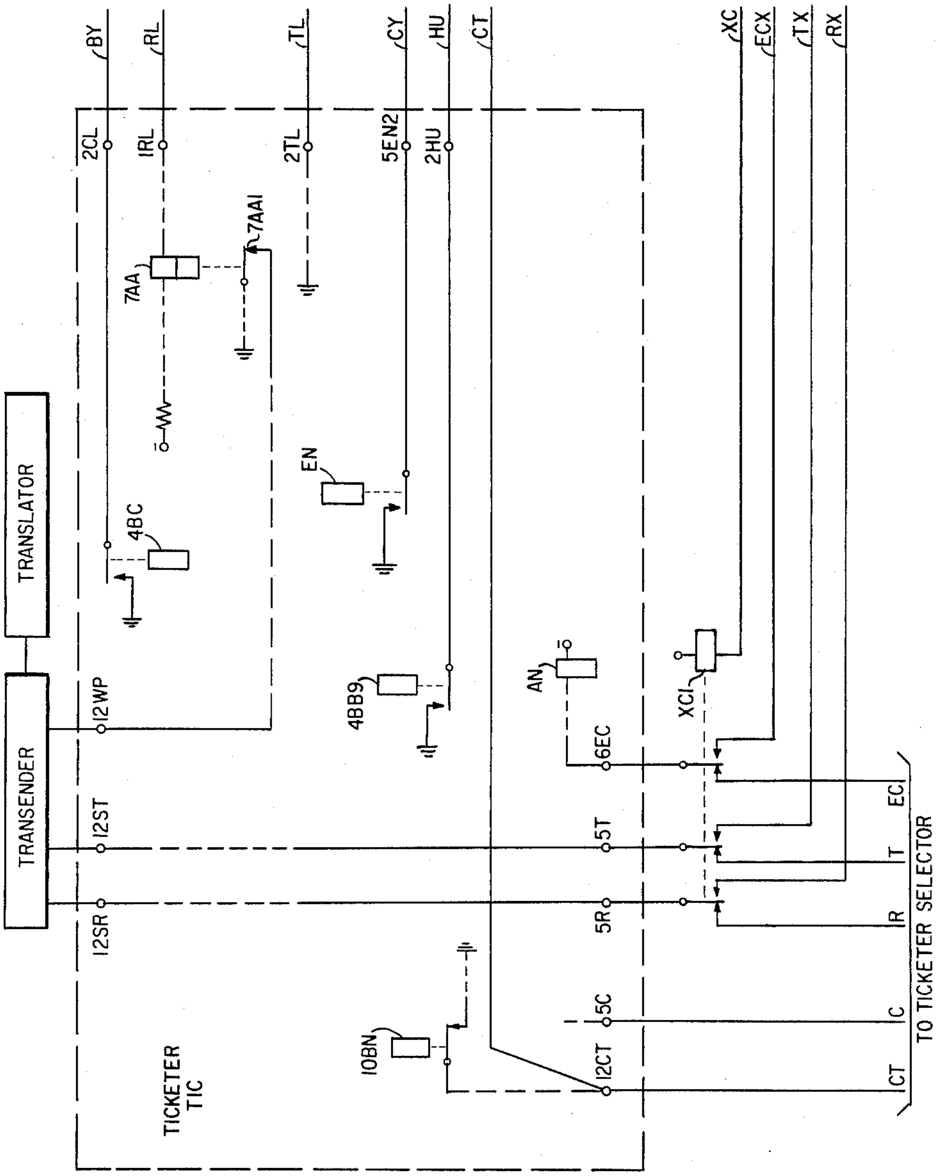

Referring now more particularly to the drawings where FIG. 1 illustrates the details of the adapter circuit in schematic form, while FIG.2 illustrates a connecting exchange A and the auxiliary equipment of the tandem exchange. FIG. 3 shows in abbreviated form the parts of the ticketer that are pertinent to the operation of this adapter. The designations of the components are those of the earlier referred to ticketer, in patent 3,136,857.

*General*

This adapter circuit is arranged to provide access for tandem through calls to a group of ticketers of the type disclosed in the patent to J. E. Ostline, I. V. Coleman and J. W. Taugner No. 3,019,295 issued January 30, 1962, or in the application of E. J. Glenner, Serial No. 70,526, filed November 21, 1960 now Patent *No.* 3,136,857, issued June 9, 1964 and their associated transenders and translators such as disclosed in the I. V. Coleman application, Serial No. 73,749, filed December 5, 1960 now Patent No. 3,109,895 issued November 5, 1963 or Serial No. 73,682, also filed December 5, 1960 now Patent No. 3,136,862 issued June 9, 1964, for the purpose of obtaining routing information, including possible alternate routing, through the tandem office. These reference patents are hereby incorporated as a part hereof, as if fully set forth.

In a particular application of this adapter circuit, locally ticketed calls originating in tributary offices will be received in the tandem office on incoming intertoll selectors and routed to this adapter circuit, which accesses one of the ticketers. After switching through to a ticketer, the adapter signals the tributary office by the removal of a stop-dial signal, to pulse forward the seven or ten digit address of the called station. Through the operation of a switching relay XC1 associated with the ticketer, but controlled by the adapter circuit, the outpulsing in response to the address received is passed through this adapter to an appropriate intertoll trunk. The ticketer signals the adapter upon completion of the outpulsing, and the adapter switches through the incoming to the outgoing intertoll switch train and releases the connection to the ticketer. The ticketer is then available for access by another adapter or a local subscriber, in the tandem exchange, while the adapter remains held in the switch train for the duration of the intertoll call.

*Description*

This circuit is seized from an incoming toll selector ITS over leads −L, +L, C and EC. Ground potential on the C lead marks this circuit as busy to searching intertoll selectors. Upon access of an intertoll selector to this circuit, a simplex pulsing bridge is provided for the receipt of incoming pulses which are then repeated as loop pulses to the ticketer. This path is traced from the −L conductor via contacts CY2, resistor R1 and resistor R3 to relay PI and also from the +L conductor via contacts CY3, resistors R2 and R3 to relay PI. Relay PI operates over this path to prepare the pulsing circuit at contacts PI1 to the ticketer TIC and at contacts PI2 completes an operating path for relay BI. Relay BI operates completes the pulsing circuit to the ticketer at contacts BI1 marks this circuit busy to other selectors at contacts BI2, and at contacts BI3 a circuit is completed via relay TF to step the rotary switch TH to cause it to hunt for an available ticketer. During the interval that switch TH is hunting, a stop dial control potential is placed upon the EC lead toward the calling office A. Upon switch TH encountering an idle ticketer, relay TF is operated to remove the stop-dial signal at contacts TF8 to the originating office A and switch this circuit through to the ticketer TIC and also to operate relay XC1 to transfer the ticketer outpulsing path from its own ticketer selector to the adapter circuit. The pulsing path is now complete via lead RL, contacts TF1, BY1, PI1, BI1, resistor R6, and contacts TF 2 and lead TL.

*In pulsing*

Removal of the stop-dial signal, conditions the originating office center A to pulse forward the address digits of the called station. These are repeated by relay PI to the ticketer TIC. No further action is taken until the ticketer responds by pulsing out the appropriate routing instruction.

*Tandem ticketer operation*

The ticketer of the tandem office is accessed only for the purpose of obtaining the services of the transender and translator. The actual ticketing functions are not needed, in fact these are circumvented by the operation of this adapter circuit.

The ticketer is accessed via the same inputs as are used by local subscribers, that is 1RL, 2TL and 2CL. Relay 7AA operates over the closed loop and also follows the loop pulses received. The loop pulses are repeated at contacts 7AA1 to the transender via lead 12WP. The transender and translator function in the well known manner to product a routing directive, which is loop outpulsed via leads 12SR and 12ST through the ticketer to leads 5R and 5T. These leads are normally directly connected to an associated ticketer selector, but in this application they are taken through the contacts of relay "XC1" to the ticketer selector. The ticketer can therefore perform all of its normal functions in completing a locally originated call. A call originated from the adapter still looks like a locally originated call to the ticketer, but now the 5R and 5T leads are switched to the intertoll selector associated with the adapter circuit by the operation of relay XC1 operated by the adapter.

The remaining leads 5C, 6E6 also switched by relay XC1 are used in the normal manner for supervisory purposes from the connected equipment. Lead 2HU is the lead connected to the ticketer hunter of the adapter circuit to cause it to step to the next ticketer should this particular one be busy. Leads 5EN2 and 12CT of the ticketer correspond respectively to leads CY and CT of the adapter.

*Out pulsing*

The translator furnishes an appropriate routing instruction and the required routing and address digits are outpulsed from the ticketer-sender combination. This circuit is arranged to accept for sending either all D.C. or part D.C. and part multi-frequency pulsing, depending upon the type of office to which the call is to be forwarded.

For all D.C. pulsing, the adapter relay PO is operated via a path including conductor RX and TX and contacts TF3 and TF4. Relay PO then operates in response to the loop pulses from the ticketer to control contacts PO1 via coil IMP, resistor R4, contacts CT1 and CY1 to conductors —SW and also via resistor R5 contacts CT2, CY4 to conductor +SW to the outgoing intertoll selector OITS. If however multi-frequency pulsing is involved, relay CT is operated from the ticketer via lead CT, contacts TF5 to the coil of relay CT.

The operation of relay CT provides an alternating current path from conductors RX and TX via capacitors C1 and C2, contacts CT1 and CT2 directly via contacts CY1 and CY4 to leads —SW and +SW for the remainder of the outpulsing in multi-frequency form. The two capacitors C1 and C2 are only for the purpose of coupling the multi-frequency pulses out to the line and are not used for voice transmission.

*Switch through*

Upon the completion of all the out pulsing, the ticketer circuit signals this circuit to switch through the incoming to the outgoing intertoll train by placing an operating potential via lead CY, contacts TF6 to relay CY. Relay CY operates completing at contacts CY1 a path from lead —L to —SW and at contacts CY4 from lead +L to +SW relay PI is released as is also Relay BI. Relay CY locks via its make contacts CY5 to the holding potential from the outgoing intertoll selector at lead CSW. The operation of relay contacts CY5 releases relay CT. Relay TF is released when relay BI opens contacts BI3. This operation of releasing all of the operating relays in this circuit results in only relay CY remaining operated under control of the outgoing selector to maintain the intertoll connection switched straight through this circuit. The ticketer is now completely released for use by other equipment. Relay CY remains thus held for the duration of the intertoll connection under control of the CSW lead holding ground.

*Busy condition*

A flashing busy signal at the rate of 120 interruptions per minute may be returned to the calling office under control of relay BY. Should an all ticketers busy condition be encountered or should the ticketer encounter a busy condition during the outpulsing interval prior to switching through of this circuit the relay BY would be operated from the ticketer via lead BY, contacts TF10. Relay BY operates to close at contacts BY3 a source of 120 IPM current to lead EC. After this circuit is in the switch through condition, supervision is under the direct control of the distant office to which the call is forwarded.

The simplicity of this circuit as utilized for accessing, a ticketer translator and sender combination for obtaining routing information at a tandem exchange and then releasing this common equipment after obtaining the necessary routing adapts this circuit for wide and extensive use in suburban and rural exchange areas and makes possible the economical use by independent operators of simplified automatic toll ticketing equipment without routing facilities.

These and various other features of the disclosed apparatus are believed to constitute a new and desirable advancemnt in the art, these features and others being now set forth in the accompanying claims.

What is claimed is:

1. In an automatic toll ticketing telephone system serving subscribers in a plurality of interconnected exchanges, call extending circuits, and trunk lines interconnecting said exchanges, a first exchange having a recording trunk equipment operated to ticket inter-exchange calls and a calling subscriber station including outpulsing means operated to control said call extending means to access said recording trunk equipment and extend an originating call; a second exchange with toll ticketing equipment including, a ticketer, and routing means for controlling the extension of a call comprising a translator, a sender and a ticketer selector, at least one of said trunk lines connecting said first exchange recording trunk and said second exchange;

an adapter circuit in said exchange, said one trunk line terminating at said second exchange in said adapter circuit, a ticketer access means in said adapter, an intertoll selector connected to said adapter circuit, and a transfer relay, said ticketer access means and said transfer relay operated upon seizure of said adapter circuit from said recording trunk equipment, said transfer relay's contacts connected to transfer said ticketer's outgoing transmission and control leads from said ticketer selector to said intertoll selector via said adapter circuit, said adapter circuit connected to said second exchange ticketer; said ticketer, translator and sender combination operated by said first station's outpulsing means to further outpulse to said intertoll selector and a selected outgoing trunk via said transfer relay contacts, first relay means operated upon completion of outpulsing to release said transfer relay to reconnect said ticketer to said ticketer selector, other means thereafter operated to release said second exchange ticketer, whereby said second exchange ticketer is prevented from completing a ticketing operation.

2. In a toll ticketing telephone system, the combination as claimed in claim 1, wherein said second exchange trunk circuit includes a second relay means operated in response to seizure of said trunk circuit to place a stop-dial signal upon said trunk line.

3. In a toll ticketing telephone system, the combination as claimed in claim 2, wherein said second exchange includes a plurality of ticketers including said available ticketer, a rotary selector in said trunk circuit and means operated by said second relay means to complete an operate circuit for the operation of said rotary switch, said rotary switch operated to access an available ticketer, third relay means operated upon connection with an available ticketer to remove said stop-dial signal and stop said rotary selector.

4. In a toll ticketing telephone system, the combination as claimed in claim 3, wherein said third relay means include contact means closed upon operation thereof to complete a loop pulsing path to said ticketer, seizure responsive means in said adapter thereafter operated in response to impulses via said trunk to repeat these pulses via said loop pulsing path to said ticketer.

References Cited by the Examiner

UNITED STATES PATENTS

| | | | |
|---|---|---|---|
| 2,253,998 | 8/1941 | Beerman et al. | 179—7.1 |
| 2,297,365 | 9/1942 | Ostline | 179—7.1 |
| 2,889,405 | 6/1959 | Harris | 179—7.1 |
| 3,001,029 | 11/1961 | Henning | 179—18 |
| 3,041,399 | 6/1962 | Berch et al. | 179—7.1 |
| 3,047,664 | 7/1962 | Clement | 179—7.1 |
| 3,098,125 | 7/1963 | Berch | 179—18 |

ROBERT H. ROSE, *Primary Examiner.*

WALTER L. LYNDE, *Examiner.*

H. BOOHER, H. ZELLER, *Assistant Examiners.*